United States Patent
Buchanan

(10) Patent No.: US 7,281,490 B2
(45) Date of Patent: Oct. 16, 2007

(54) GAUGE HAVING A MAGNETICALLY DRIVEN POINTER ROTATION DEVICE

(75) Inventor: Steven O. Buchanan, Rolling Prairie, IN (US)

(73) Assignee: Dwyer Instruments, Inc., Michigan City, IN (US)

(*) Notice: Subject to any disclaimer, the term of this patent is extended or adjusted under 35 U.S.C. 154(b) by 231 days.

(21) Appl. No.: 11/191,099

(22) Filed: Jul. 27, 2005

(65) Prior Publication Data

US 2006/0021443 A1 Feb. 2, 2006

Related U.S. Application Data

(60) Provisional application No. 60/592,214, filed on Jul. 29, 2004.

(51) Int. Cl.
*G01L 19/08* (2006.01)
*G01L 9/11* (2006.01)

(52) U.S. Cl. .................. 116/271; 116/204; 116/284; 73/735

(58) Field of Classification Search ............... 116/271, 116/276, 204, 264, 266, 267, 284, 285
See application file for complete search history.

(56) References Cited

U.S. PATENT DOCUMENTS

| | | | |
|---|---|---|---|
| 1,753,552 A * | 4/1930 | Cornell | ................ 73/254 |
| 3,862,416 A | 1/1975 | Phillips | |
| 4,011,759 A | 3/1977 | Phillips et al. | |
| 4,030,365 A | 6/1977 | Phillips et al. | |
| 4,347,744 A | 9/1982 | Buchanan | |
| 4,374,475 A | 2/1983 | Hestich | |
| 4,827,095 A | 5/1989 | Clark et al. | |
| 4,841,782 A * | 6/1989 | Buchanan | ................ 73/861.74 |
| 4,938,076 A | 7/1990 | Buchanan | |
| 5,012,678 A | 5/1991 | Buchanan | |
| 5,061,832 A | 10/1991 | Squires | |
| 5,533,414 A * | 7/1996 | Huang | ................ 73/866.1 |
| 6,089,098 A | 7/2000 | Tylisz et al. | |
| 6,499,353 B1 * | 12/2002 | Douglas et al. | ................ 73/722 |
| 6,763,725 B1 | 7/2004 | Huang | |
| 6,789,434 B2 | 9/2004 | Peterson | |
| 6,981,421 B2 * | 1/2006 | Palmer et al. | ................ 73/735 |
| 2005/0193824 A1 * | 9/2005 | Heuer et al. | ................ 73/715 |

FOREIGN PATENT DOCUMENTS

| | | |
|---|---|---|
| TW | 241899 | 2/1995 |
| TW | 421156 | 1/2000 |

* cited by examiner

*Primary Examiner*—Richard Smith
*Assistant Examiner*—Amy R. Cohen
(74) *Attorney, Agent, or Firm*—Barnes & Thornburg LLP

(57) ABSTRACT

A gauge for indicating a measured variable such as pressure. The gauge includes a motion detection device including a drive magnet that is adapted to be moveable in response to changes in the variable. The pointer rotation device includes a pivot member, a power magnet coupled to the pivot member, and one or more director members located adjacent the power magnet. Each director member includes a generally helical flange. A pointer is coupled to the pointer rotation device. The director members and the power magnet form a magnetic field adapted to magnetically couple the pointer rotation device to the drive magnet. The pointer rotation device is adapted to rotate about a rotational axis. Movement of the drive magnet in response to changes in the variable rotates the pointer rotation device and the pointer about the rotational axis such that the pointer indicates the measured variable.

Figure 1:
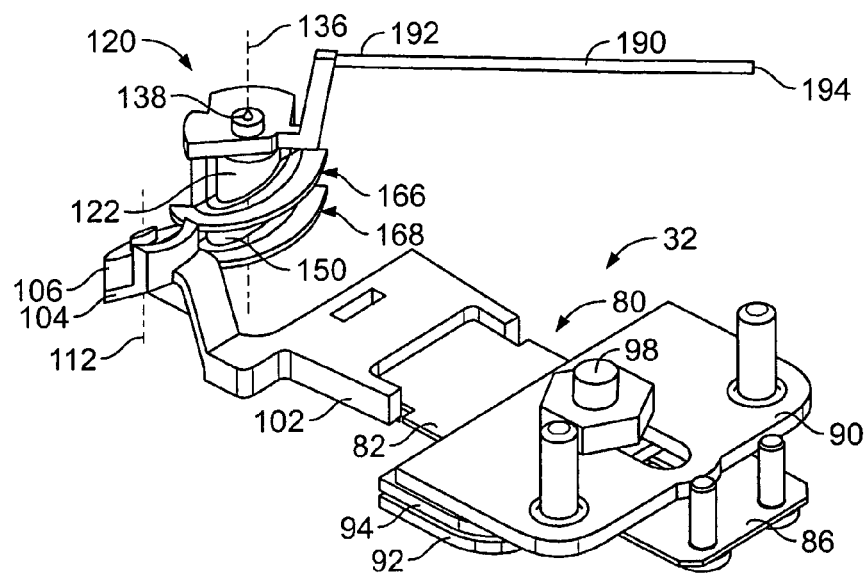

18 Claims, 9 Drawing Sheets ic # GAUGE HAVING A MAGNETICALLY DRIVEN POINTER ROTATION DEVICE

RELATED APPLICATIONS

This application claims the benefit of U.S. Provisional Application No. 60/592,214, filed Jul. 29, 2004.

BACKGROUND OF THE INVENTION

The present invention is directed to a gauge having a magnetically driven pointer rotation device that is adapted to detect and indicate the position of a drive magnet coupled to a pressure sensing flexible diaphragm, and in particular a pointer rotation device including a power magnet that creates a magnetic circuit with the drive magnet.

Gauges, such as pressure gauges, include a flexible diaphragm that is located between a first fluid chamber and a second fluid chamber. A pointer assembly is often located in an indicator chamber of the gauge. The indicator chamber is separated from the fluid chambers by a separating wall that includes an aperture through which the pointer assembly is mechanically coupled to the diaphragm. In such a case, fluid within a fluid chamber is in contact with the pointer assembly. Mechanical or adhesive seals between the pointer assembly and the separating wall can be used, but the seals are prone to leakage and allow fluid to enter the indicator chamber. It is undesirable to have fluid come into contact with the pointer assembly as the fluid causes contamination of the pointer assembly and decreased operating efficiency.

A magnet coupled to the diaphragm has been provided in a fluid chamber for magnetic coupling to a helix attached to a pointer. A solid separating wall is provided between the magnet and the helix to separate the helix and pointer from the fluid chamber. However, the size of the air gap between the magnet and the helix must be relatively small and the air gap dimension must be closely controlled to avoid diminished accuracy in the pointer accurately reflecting the magnet position.

SUMMARY OF THE INVENTION

A gauge for indicating a measured variable, such as pressure, flow rate, temperature or velocity. The gauge includes a motion transmitting mechanism comprising a motion detection device and a pointer rotation device. The motion detection device includes a drive magnet that is adapted to be moveable along a generally linear axis in response to changes in the variable. The pointer rotation device is adapted to rotate about a rotational axis. The pointer rotation device includes a pivot member, a pointer coupled to the pivot member, a power magnet coupled to the pivot member, and one or more director members located adjacent the power magnet. Each director member includes a generally helical flange. The director members and the power magnet form a magnetic field adapted to magnetically couple the pointer rotation device to the drive magnet. A pointer is coupled to the pointer rotation device. Movement of the drive magnet of the motion detection device rotates the pointer rotation device and the pointer about the rotational axis such that the pointer indicates the measured variable.

BRIEF DESCRIPTION OF THE DRAWING FIGURES

Figure 2:
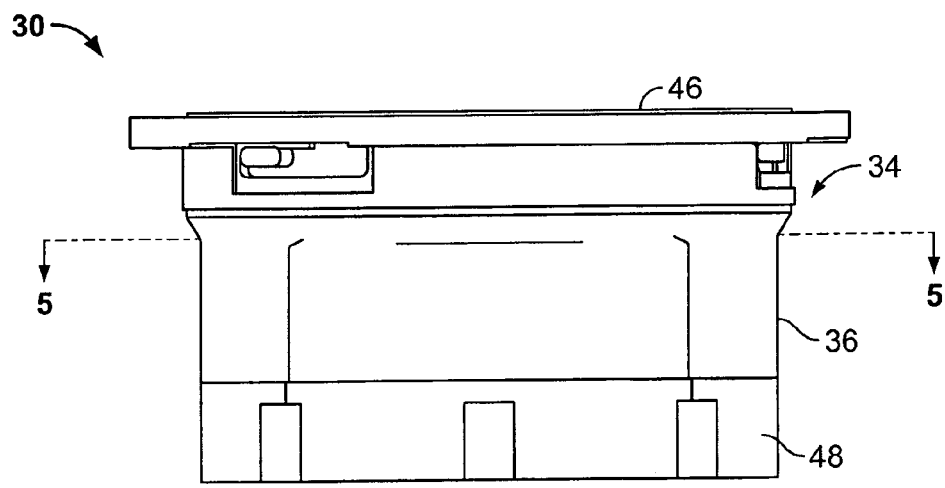
Figure 3:
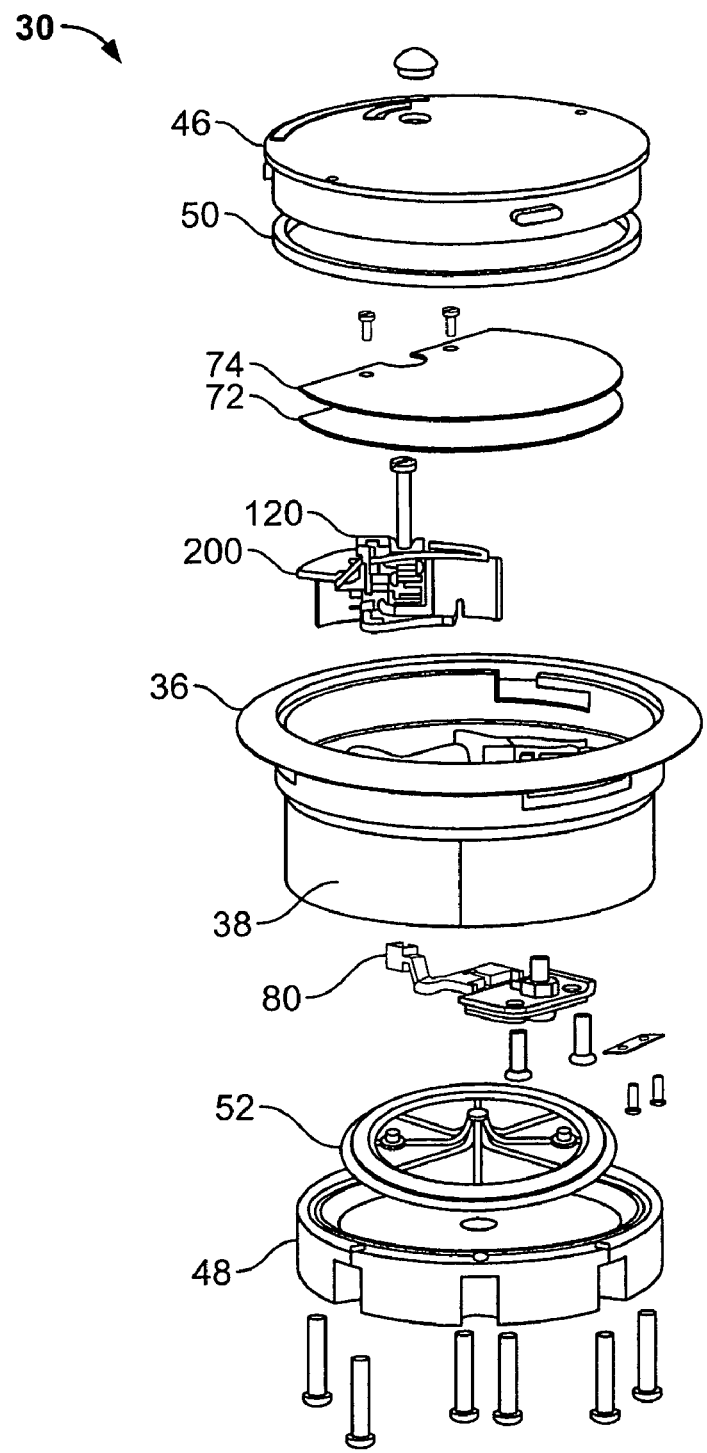
Figure 4:
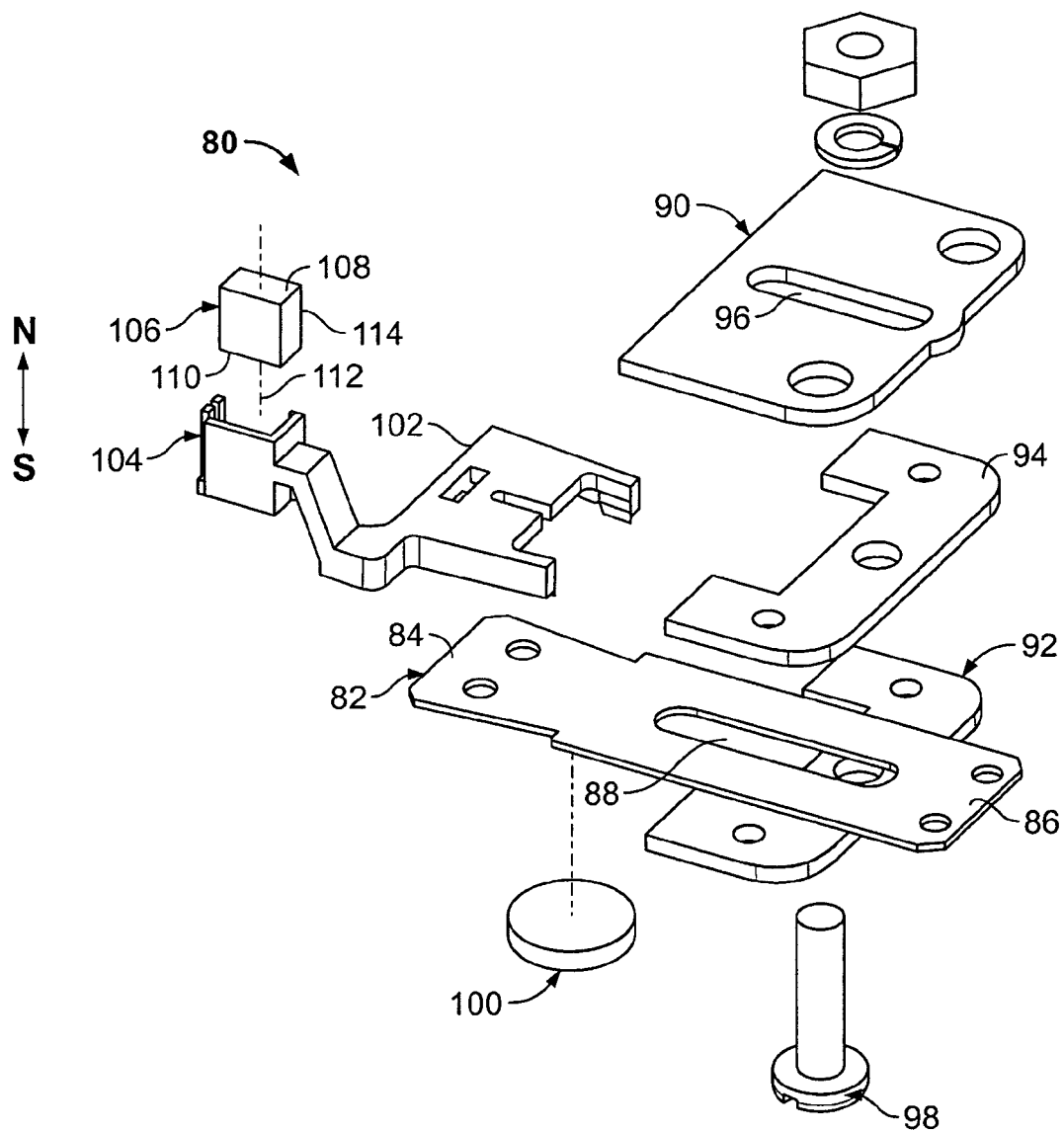
Figure 5:
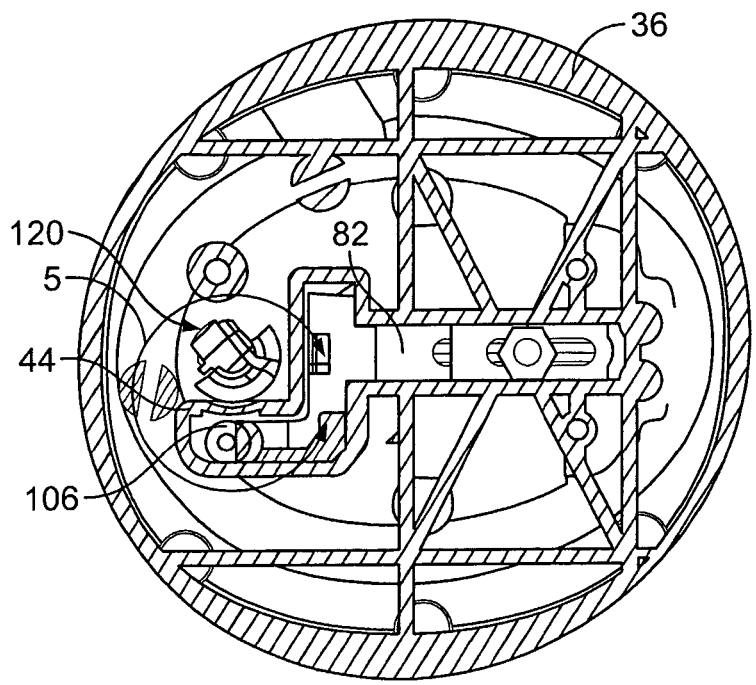
Figure 6:
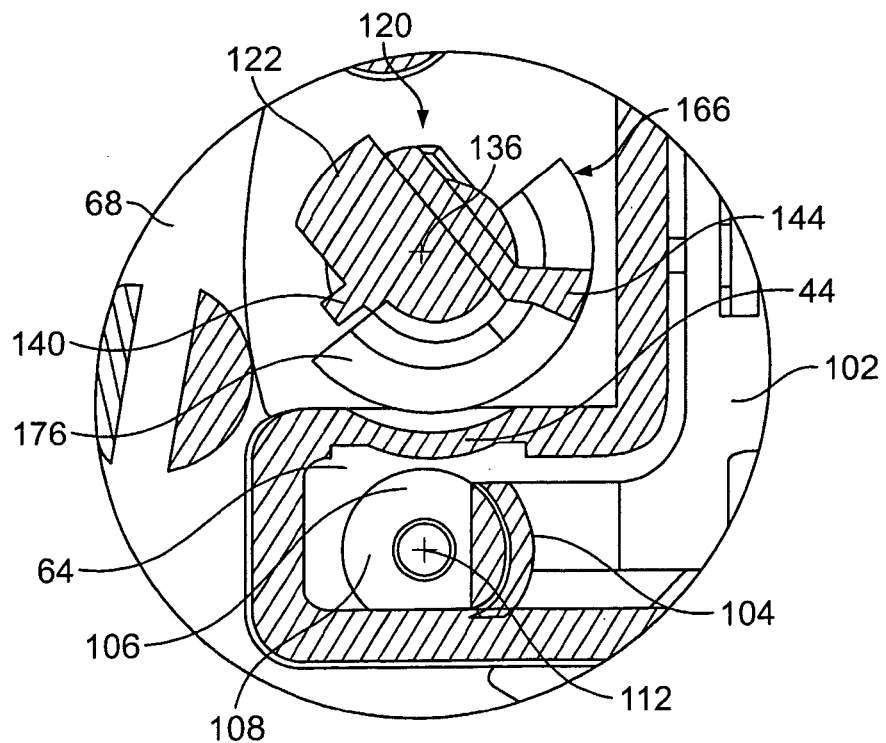
Figure 7:
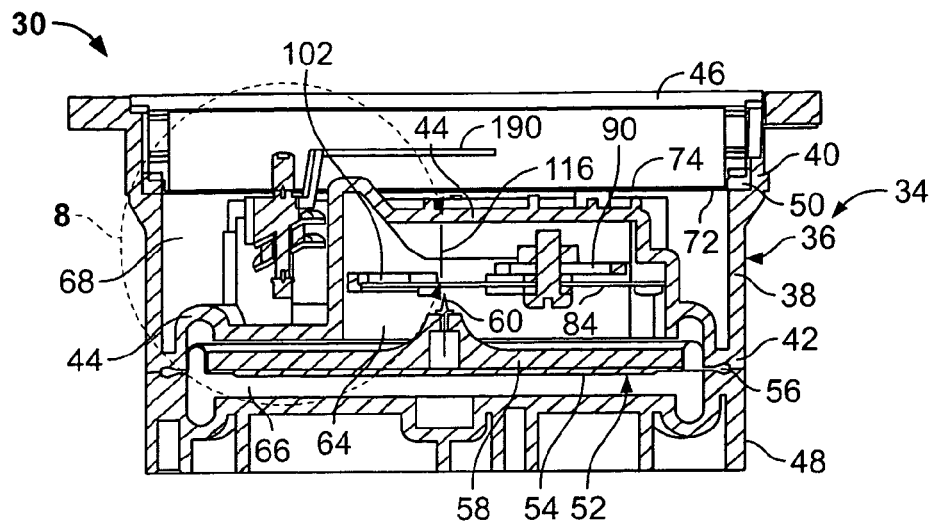
Figure 8:
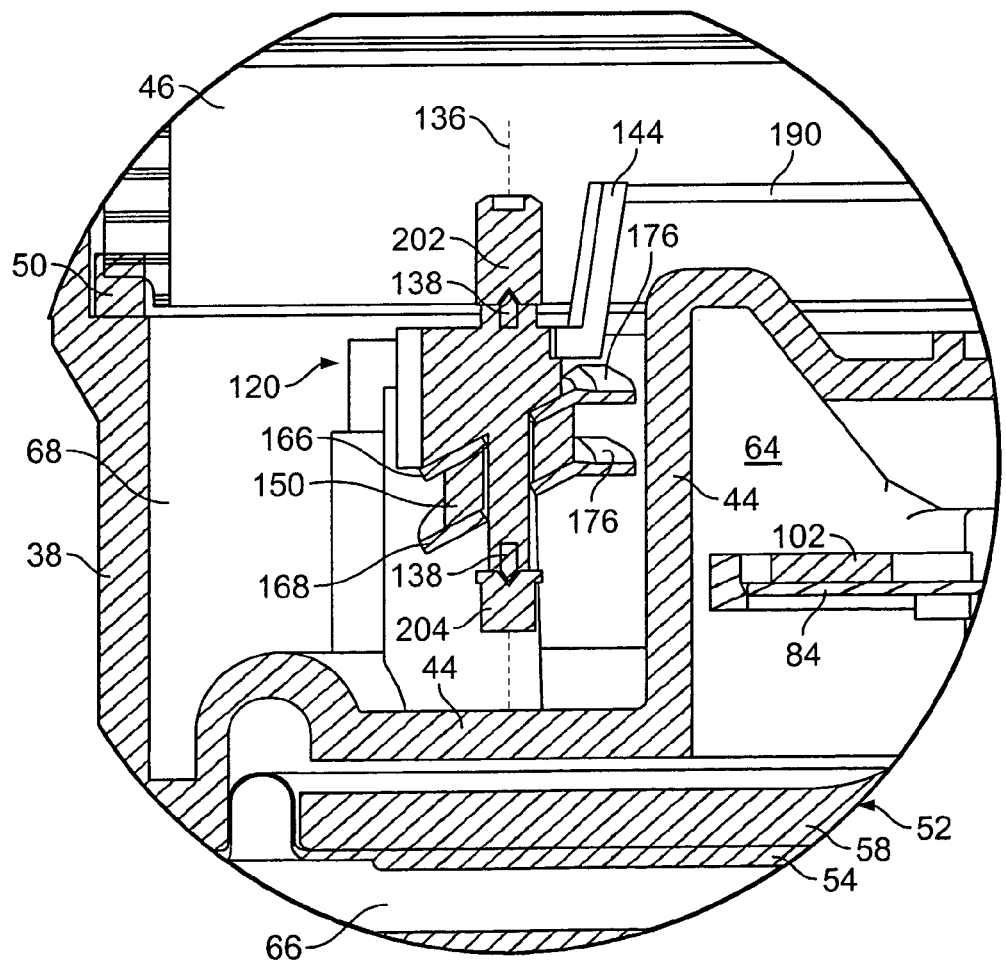
Figure 9:
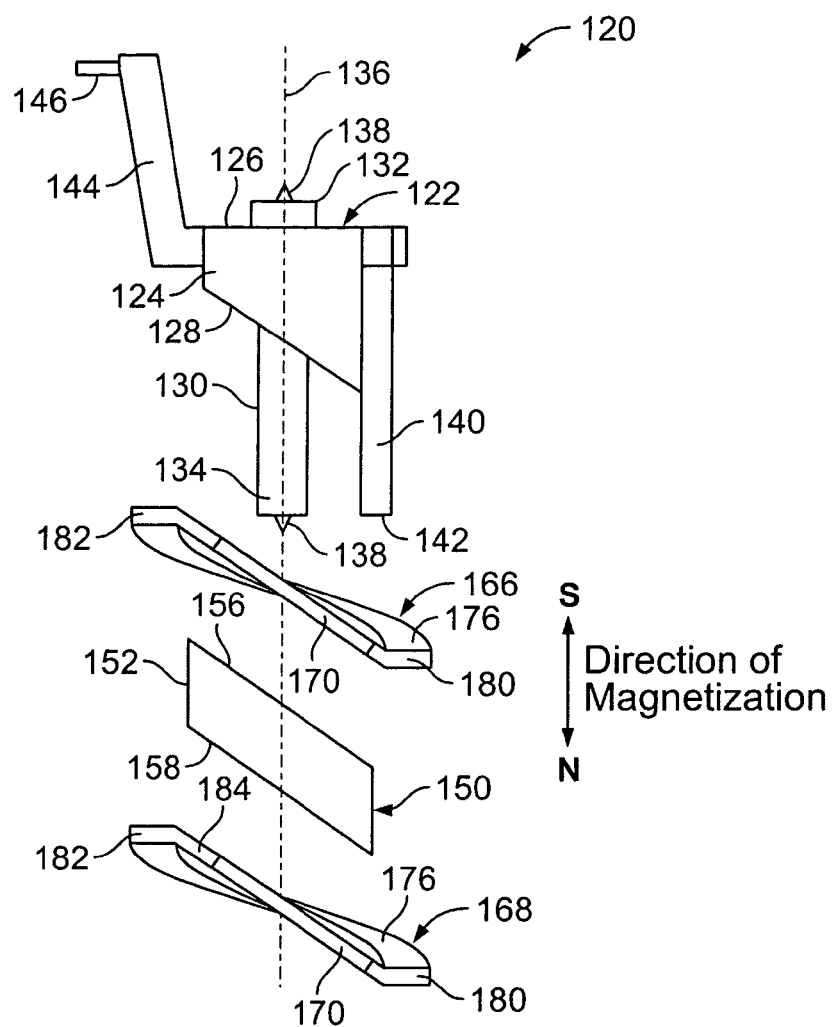
Figure 10:
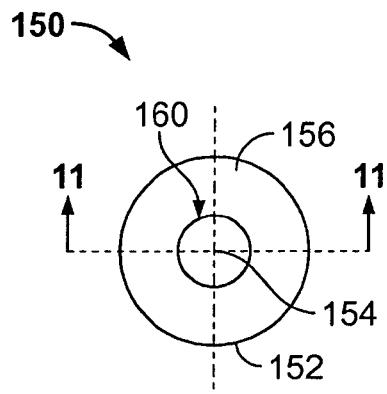
Figure 11:
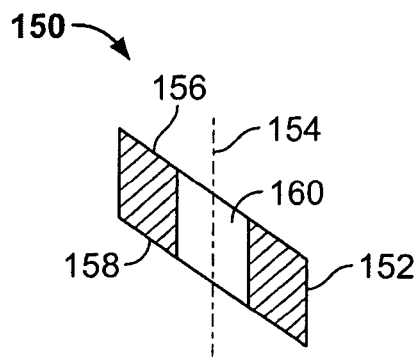
Figure 12:
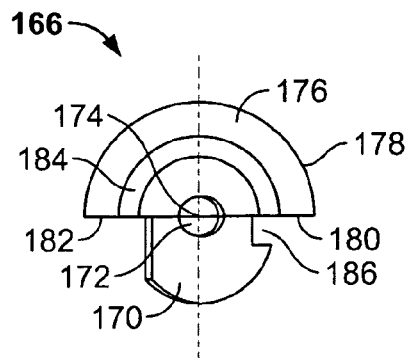
Figure 13:
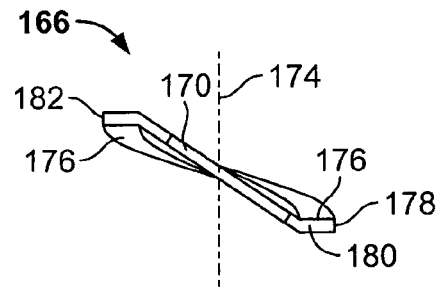
Figure 14:
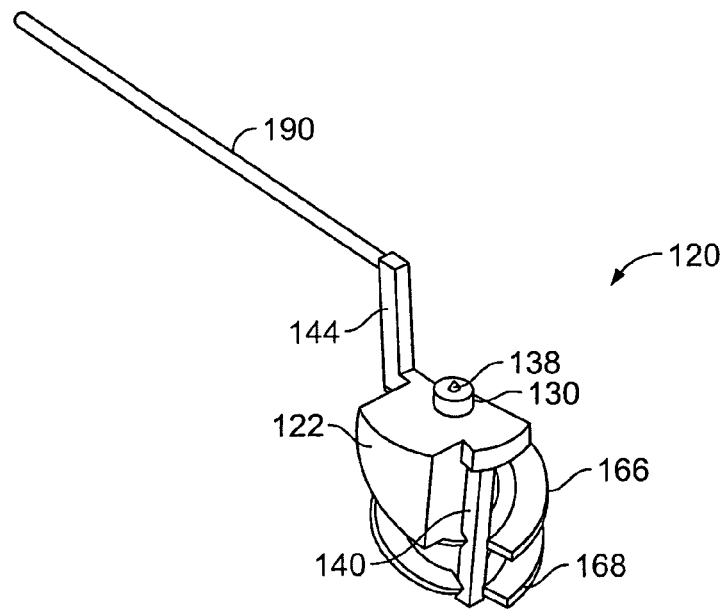
Figure 15:
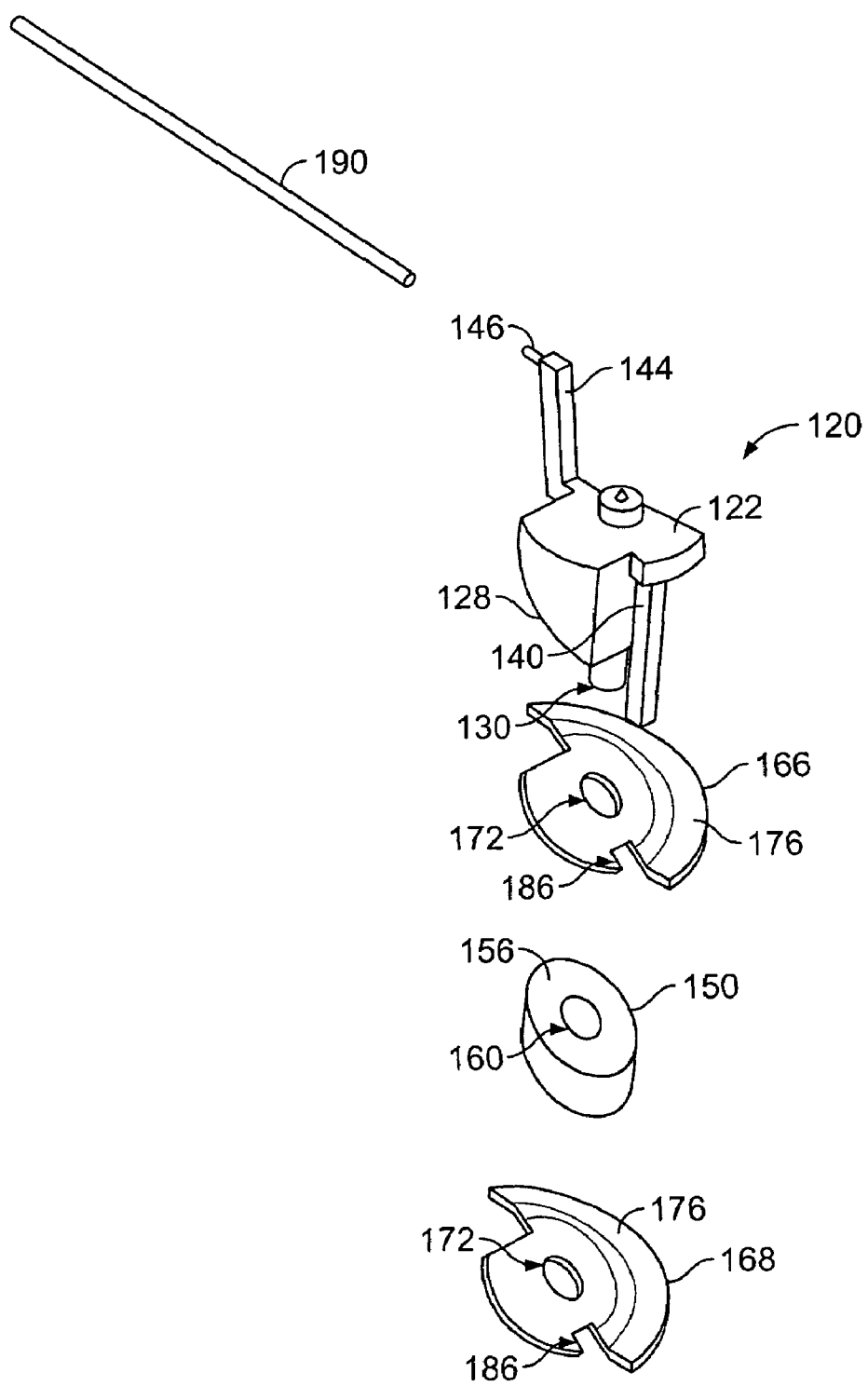
Figure 16:
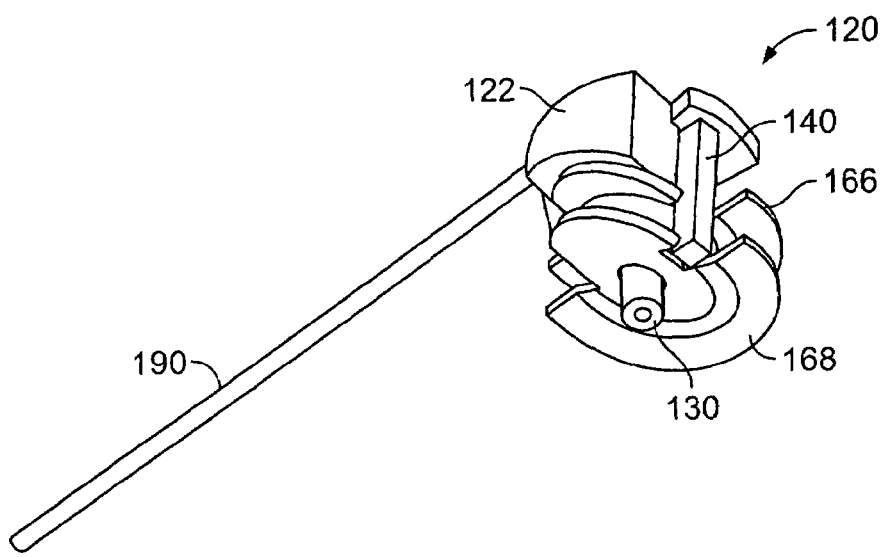
Figure 17:
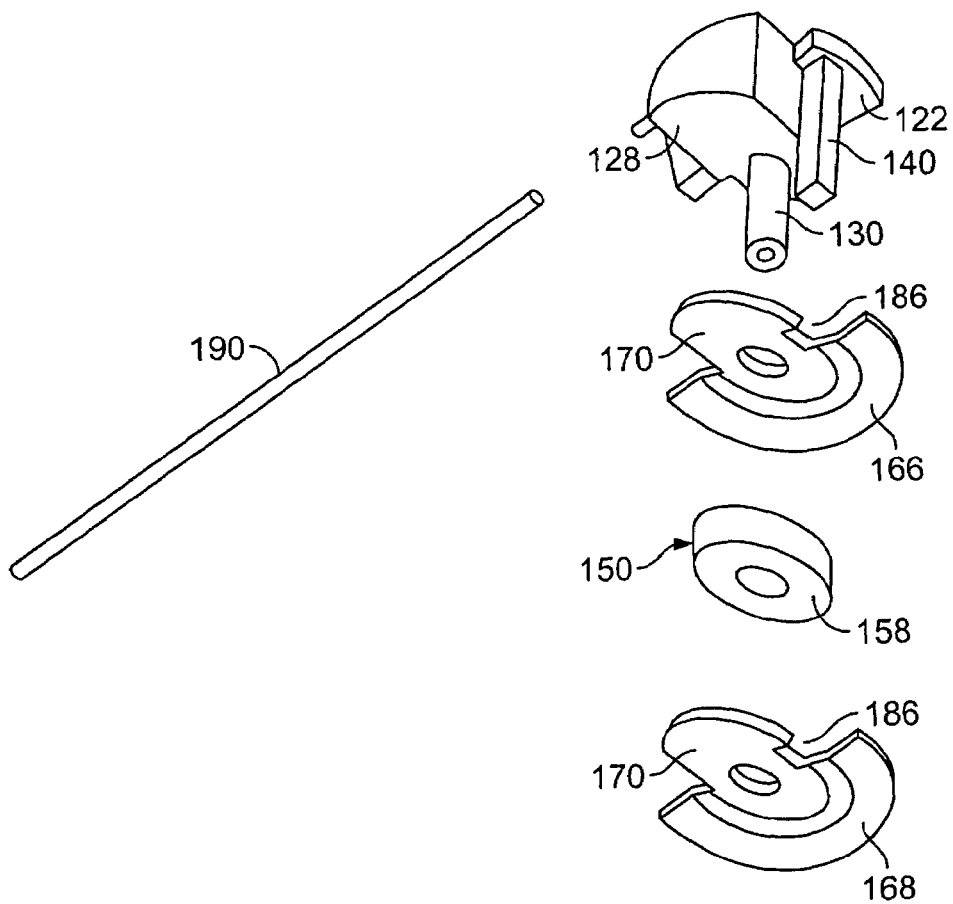

FIG. 1 is a perspective view of the motion transmitting mechanism of the gauge.
FIG. 2 is a side elevational view of the gauge.
FIG. 3 is an exploded view of the gauge.
FIG. 4 is an exploded view of the motion detection device of the motion transmitting mechanism.
FIG. 5 is a cross section view taken along line 5-5 of FIG. 2.
FIG. 6 is an enlarged detail view of a portion of FIG. 5.
FIG. 7 is a cross-sectional view of the gauge.
FIG. 8 is an enlarged detail view of a portion of FIG. 7.
FIG. 9 is an exploded view of the pointer rotation device of the motion transmitting mechanism.
FIG. 10 is a top plan view of the power magnet.
FIG. 11 is a cross-sectional view taken along line 11-11 of FIG. 10.
FIG. 12 is a top plan view of a director member of the pointer rotation device.
FIG. 13 is a side elevational view of the director member.
FIG. 14 is a top perspective view of the pointer rotation device shown with a pointer.
FIG. 15 is a top perspective exploded view of the pointer rotation device and pointer.
FIG. 16 is a bottom perspective view of the pointer rotation device and pointer.
FIG. 17 is a bottom perspective view of the pointer rotation device and pointer.

DETAILED DESCRIPTION OF THE PREFERRED EMBODIMENTS

As shown in FIGS. 1 and 2, a gauge 30 includes a motion transmitting mechanism 32. The gauge 30 may be a pressure gauge adapted to sense and indicate a measured pressure which may be a differential in pressure between the pressure of a first fluid and the pressure of a second fluid. As shown in FIGS. 3 and 7, the gauge 30 includes an enclosure 34 having a housing 36. The housing 36 includes a circumferential side wall 38 that extends from a first end 40 to a second end 42. The housing 36 also includes an interior barrier wall 44 that is solid and non-perforate and that is integrally attached to the side wall 38. The enclosure 34 also includes a viewing cover 46 that is removably attached to the first end 40 of the side wall 38. The cover 46 may be formed from a clear see-through plastic material. The enclosure 34 also includes a back plate 48 that is removably attached to the second end 42 of the side wall 38. The housing 36, cover 46 and back plate 48 are all molded from a plastic material. The cover 46 is sealed fluid-tight to the housing 36 by a resilient gasket 50 located therebetween.

The gauge 30 includes a flexible diaphragm 52. The diaphragm 52 includes a resilient and flexible diaphragm member 54 having an oval-shaped circumferential rim 56. The diaphragm 52 also includes a diaphragm plate 58 that is attached to one side of the diaphragm member 54 generally centrally within the rim 56. An engagement member 60, such as a stab pin, is attached to the diaphragm plate 58 and thereby to the diaphragm member 54. The engagement member 60 is located generally at the central transverse axis of the diaphragm member 54 and projects outwardly along the transverse axis away from the diaphragm member 54.

The gauge 30 includes a first fluid chamber 64 formed between the diaphragm 52 and the barrier wall 44 of the housing 36, and a second fluid chamber 66 that is formed between the diaphragm 52 and the back plate 48. The enclosure 34 includes a first port that is in fluid communication with the first fluid chamber 64 and a second port that is in fluid communication with the second fluid chamber 66. Each fluid chamber may be placed in fluid communication with a respective source of fluid. If desired, one fluid chamber may be placed in communication with the atmosphere. The first fluid chamber 64 is separated from and is sealed fluid-tight from the second fluid chamber 66 by the diaphragm 52. The gauge 30 also includes an indicator chamber 68 formed by the barrier wall 44 of the housing 36 and the cover 46. The indicator chamber 68 is separated from and is sealed fluid-tight in leak-proof isolation from the first fluid chamber 64 by the solid one-piece non-perforate barrier wall 44 and the integral attachment of the barrier wall 44 to the side wall 38. The barrier wall 44 isolates and seals the indicator chamber 68 fluid-tight from fluid in the fluid chamber 64, and from fluid in the fluid chamber 66 if the diaphragm 52 should leak. A scale plate 72 having a graduated scale 74 is attached to the housing 36 such that the scale 74 is visible through the cover 46. The scale 74 may include a plurality of indicia for indicating a range of pressures.

The motion transmitting mechanism 32 includes a motion detection device 80 adapted to detect and transmit movement of the diaphragm 52. As shown in FIG. 4, the motion detection device 80 includes a resiliently flexible plate spring 82 having a first end 84 and a second end 86. The plate spring 82 includes an elongate longitudinally extending slot 88. A spring rate adjustment plate 90 is attached to the plate spring 82 and is selectively positionable along the plate spring 82 between the first end 84 and second end 86. A base plate 92 is located adjacent the bottom side of the plate spring 82 and a spacer plate 94 is located adjacent the top side of the plate spring 82, and is positioned between the plate spring 82 and the rate adjustment plate 90. The rate adjustment plate 90 includes an elongate slot 96 that extends parallel to the slot 88 of the plate spring 82. The plate spring 82, base plate 92 and spacer plate 94 are connected to one another by a fastener 98 that extends through the slots 88 and 96. The fastener 98 may be a threaded fastener such as a bolt and nut. The fastener 98 extends through the slot 88 in the plate spring 82 and through apertures in the clamp plates 92 and 94, and allows the clamp plates 92 and 94 to be selectively positioned along the longitudinal length of the plate spring 82 to thereby adjust the stiffness of the plate spring 82. A pad 100 is attached to the bottom side of the rate adjustment plate 90 adjacent the first end 84 of the plate spring 82. A mounting bracket 102 is attached to the first end 84 of the plate spring 82. The mounting bracket 102 includes a first end attached to the first end 84 of the plate spring 82 and a second end including a holder 104.

A drive magnet 106 is retained by the holder 104 such that the drive magnet 106 is coupled to the second end of the mounting bracket 102 and to the first end 84 of the plate spring 82. The drive magnet 106 includes a generally planar top surface 108 and a generally planar bottom surface 110 that is spaced apart from and generally parallel to the top surface 108. The top and bottom surfaces 108 and 110, as shown in FIG. 4, are generally perpendicular to a linear central axis 112. The drive magnet 106 also includes a peripheral side wall 114. The drive magnet 106 as shown in FIG. 4 is in the form of a generally rectangular parallelepiped, but may be formed in other configurations, for example in the configuration as shown in FIGS. 1, 5 and 6. The drive magnet 106 is magnetized in a direction generally parallel to the central axis 112 with the North pole being located at the top surface 108 and the South pole being located at the bottom surface 110.

As shown in FIG. 7 the motion detection device 80 is located within the first fluid chamber 64. The second end 86 of the plate spring 82 is attached to the barrier wall 44 of the housing 36 such that the plate spring 82 extends in a cantilevered manner from the second end 86. The engagement member 60 of the diaphragm 52 engages the pad 100 of the motion detection device 80. An increase in the pressure of the second fluid within the second fluid chamber 66 with respect to the pressure of the first fluid in the first fluid chamber 64 will cause the diaphragm 52 and engagement member 60 to move toward the barrier wall 44 in a first direction along a generally linear central axis 116. The axis 116 is generally perpendicular to the diaphragm 52 and generally perpendicular to the plate spring 82. A decrease in the pressure of the second fluid within the second fluid chamber 66 with respect the pressure of the first fluid in the first fluid chamber 64 will cause the diaphragm 52 to move toward the back plate 48 in a second direction along the axis 116 that is opposite the first direction. Movement of the diaphragm 52 and engagement member 60 along the axis 116 in either the first or second direction causes or allows the plate spring 82 to resiliently flex. The flexing movement of the plate spring 82 causes the drive magnet 106 to correspondingly move generally linearly along the central axis 112 which is generally parallel to the axis 116. As the drive magnet 106 is attached to the housing 36 in a cantilevered manner, movement of the drive magnet 106 along the axis 116 follows the path of an arc of a relatively large diameter circle over a relatively short distance. However, such movement by the drive magnet 106 is considered herein to be generally linear.

The gauge 30 also includes a pointer rotation device 120 that is located within the indicator chamber 68. As shown in FIG. 9 the pointer rotation device 120 includes a pivot member 122 having a body 124. The body 124 includes a generally planar top surface 126 and a spaced apart beveled or inclined generally planar surface 128. The pivot member 122 includes a generally cylindrical pivot post 130 having a first end 132 and a second end 134. The post 130 includes an upper portion that extends upwardly from the top surface 126 of the body 124 and a lower portion that extends downwardly from the inclined surface 128 of the body 124. The post 130 includes a generally linear central axis 136 about which the pointer rotation device 120 is adapted to rotate. A pivot pin 138 extends outwardly from each end 132 and 134 of the post 130. The pivot pins 138 are located along the axis 136.

The pivot member 122 also includes a gauging post 140. The gauging post 140 is attached to the peripheral side wall of the body 124 and extends beyond the inclined surface 128 to an outer end 142. The gauging post 140 extends generally parallel to and is spaced apart from the pivot post 130. The gauging post 140 has a generally rectangular cross section but may be formed in other configurations if desired. The pivot member 122 also includes an arm 144 having a first end attached to the side wall of the body 124 and a second end including a mounting pin 146. The mounting pin 146 extends outwardly from the second end of the arm 144 generally transversely and radially to the axis 136.

The pointer rotation device 120 includes a power magnet 150. As shown in FIGS. 10 and 11, the power magnet 150 includes a generally circular and cylindrical side wall 152. The side wall 152 extends about a central axis 154 of the power magnet 150. The power magnet 150 includes an inclined generally planar top surface 156 and an inclined generally planar bottom surface 158 that is spaced apart from and generally parallel to the top surface 156. A generally cylindrical bore 160 extends through the power magnet 150 from the top surface 156 to the bottom surface 158 along the axis 154. The bore 160 is sized to closely receive the pivot post 130. The surfaces 156 and 158 are inclined with respect to the axis 154 at the same angle that the inclined surface 128 of the body 124 is inclined with respect to the axis 136. The power magnet 150 is magnetized in a direction generally parallel to the axis 154 with the South pole being located at the top surface 156 and the North pole being located at the bottom surface 158. The poles of the power magnet 150 are inverted with respect to the poles of the drive magnet 106.

The pointer rotation device 120 also includes a first director member 166 and a second director member 168. The first and second director members 166 and 168 are formed and constructed identically to one another. As shown in FIGS. 12 and 13, the director member 166 includes a generally planar mounting portion 170 having a generally centrally located aperture 172. A generally linear axis 174 extends centrally through the aperture 172. The mounting portion 170 is positioned at an inclined angle to the central axis 174 which is equal to the angle at which the inclined surface 128 of the pivot member 122 is inclined, and at which the top and bottom surfaces 156 and 158 of the power magnet 150 are inclined. The aperture 172 is generally cylindrical or circular as viewed parallel to the axis 174, but is generally elliptical shaped as viewed transversely to the mounting portion 170. The aperture 172 is adapted to closely receive the pivot post 136 of the pivot member 122 such that the central axis 174 is coaxial with the axis 136.

The director member 166 includes a generally helical flange 176 having a generally helical outer edge 178. The helical flange 176 extends in a helical manner about the axis 174 approximately one-half turn, or one-hundred eighty degrees, from a first end 180 to a second end 182. The helical flange 176 advances along the central axis 174 at the rate of approximately 0.228 inches per one-hundred eighty degrees of rotation about the central axis 174. The director member 166 includes a transition portion 184 that extends between the mounting portion 170 and the helical flange 176. The mounting portion 170 of the director member 166 includes a gauge notch 186 formed between two opposing side walls that is adapted to receive the gauging post 140 of the pivot member 122. The director members 166 and 168 are preferably formed from a highly magnetically permeable material, such as for example, HYMU 80.

The mounting portion 170 of the director members 166 and 168 may be inclined at an angle of approximately fifty-six degrees with respect to the central axis 174. If desired, the mounting portion 170 can be inclined at other angles with respect to the axis 136 and 174 including perpendicular thereto. However, the fifty-six degree angle of inclination has been found to be beneficial in enabling the director members 166 and 168 to be formed cost effectively in a metal stamping operation. If the angle of inclination of the mounting portion 170 is changed, the angle of inclination of the inclined surface 128 of the body 124, and of the top and bottom surfaces 156 and 158 of the power magnet 150, should also be similarly changed.

The first director member 166 is attached to the pivot member 122 by inserting the pivot post 130 through the aperture 172 and inserting the gauging post 160 into the gauge notch 186. The mounting portion 170 matingly engages the inclined surface 128 of the body 124 and is attached thereto with a fastener, such as an adhesive, to prevent movement along and about the longitudinal axis of the pivot post 130. The power magnet 150 is attached to the pivot member 122 by inserting the pivot post 130 through the bore 160 of the power magnet 150 such that the top surface 156 matingly engages the mounting portion 170 of the first director member 166. The power magnet 150 is attached to the mounting portion 170 of the first director member 166 with a fastener, such as an adhesive, to prevent movement of the magnet 150 along and about the longitudinal axis of the pivot post 130, and to couple the magnet 150 to the first director member 166 and to the pivot member 122 for conjoint rotation about the axis 136.

The second director member 168 is attached to the pivot member 122 by inserting the pivot post 130 through the aperture 174 and inserting the gauging post 140 into the gauge notch 186. The mounting portion 170 of the second director member 168 is matingly attached to the bottom surface 158 of the power magnet 150 with a fastener, such as an adhesive, to prevent movement of the second director member 168 along and about the longitudinal axis of the pivot post 130. The gauging post 140 engages the first and second director members 166 and 168 and couples the first and second director members 166 and 168 to the pivot member 122 for conjoint rotation about the axis 136. The gauging post 140 precisely aligns the first and second director members 164 and 166 with respect to the pivot member 122 and with respect to each other about the axis 136.

The power magnet 150 is sandwiched between the mounting portions 170 of the director members 166 and 168. The helical flanges 176 of the director members 166 and 168 are located radially outwardly beyond the side wall 152 of the power magnet 150. The helical flanges 176 of the director members 166 and 168 are spaced apart from one another in a direction parallel to the axis 136 a distance approximately equal to the thickness of the power magnet 150 between its top and bottom surfaces 156 and 158 as measured parallel to the central axis 154. The respective ends 180 and 182 of the first and second director members 166 and 168 are respectively aligned with one another parallel to the axis 136.

As shown in FIG. 1, the drive magnet 106, in a modified embodiment from the drive magnet shown in FIG. 4, is constructed in the same manner and configuration as the power magnet 150, including inclined top and bottom surfaces. It is preferred that the drive magnet 106 be configured in the same manner and size as the power magnet 150. The generally rectangular drive magnet 106 as shown in FIG. 4 may be used with the inclined power magnet 150, although there may be a resulting reduction in performance. The inclined surfaces 156 and 158 of the power magnet 150 are inclined to mate with the inclined mounting portions 170 of the director members 166 and 168, but may be perpendicular to the axis 154 if desired. While the pointer rotation device 120 is shown as including two spaced apart director members 166 and 168, the pointer rotation device 120, if desired, could include only a single director member, although there may be a reduction in performance.

The gauge 30 includes an elongate generally linear pointer 190 that extends between a first end 192 and a second end 194. The pointer 190 may be a generally tubular cylindrical member having a central bore. The pointer 190 may be formed from plastic. The first end 192 of the pointer 190 is attached to the arm 144 of the pivot member 122 by inserting the mounting pin 146 into the bore of the pointer 190 and attaching it thereto with a fastener such as an adhesive. The pointer 190 is thereby adapted to conjointly rotate with the pivot member 122 about the axis 136. The pointer 190 extends generally radially outwardly from the arm 144 with respect to the axis 136.

A bracket 200 attaches the pointer rotation device 120 to the housing 36. The bracket 200 includes a first jewel bearing 202 and a second jewel bearing 204. Each end 132 and 134 of the pivot post 130 of the pivot member 122 is respectively coupled to a bearing 202 and 204. The bearings 202 and 204 provide substantially frictionless rotational movement of the pointer rotation device 120 and pointer 190 about the axis 136 with respect to the enclosure 34.

As shown in FIGS. 5 and 6, the pointer rotation device 120 and the motion detection device 180 are positioned such that the linear movement axis 112 of the drive magnet 106 is positioned generally parallel to and spaced apart from the rotational axis 136 of the pointer rotation device 120. The side wall 114 of the drive magnet 106 is spaced apart from the helical edge 178 of the helical flanges 176 of the pointer rotation device 120 such that an air gap is formed therebetween. The barrier wall 44 extends between the drive magnet 106 and the pointer rotation device 120 within the air gap. The top surface 108 of the drive magnet 106 is generally laterally aligned with the portion of the helical flange 176 of the first director member 166 that is most closely adjacent to the drive magnet 106. The bottom surface 110 of the drive magnet 106 is generally laterally aligned with the portion of the helical flange 176 of the second director member 168 that is located most closely adjacent to the drive magnet 106. The drive magnet 106 is thereby laterally spaced apart from the helical flanges 176 of the pointer rotation device 120 in a lateral position that is located longitudinally between the helical flanges 176 of the director members 166 and 168.

In operation, the first fluid chamber 64 is placed in fluid communication with a first fluid having a first pressure and the second fluid chamber 66 is placed in fluid communication with a second fluid having a second pressure. An increase in the pressure of the second fluid in the second fluid chamber 66 with respect to the first pressure of the first fluid chamber 64 will cause the diaphragm 52 and engagement member 60 to move along the axis 116 in a first direction toward the barrier wall 44. Conversely, a decrease in the pressure of the second fluid in the second fluid chamber 66 with respect to the pressure of the first fluid in the first fluid chamber 64 will result in the diaphragm 52 and engagement member 60 moving along the axis 116 in a second direction away from the barrier wall 44, although the engagement member 60 remains in engagement with the pad 100 of the motion detection device 80. The position of the diaphragm 52 and engagement member 60 along the axis 116 corresponds to a sensed pressure differential between the respective fluids in the first fluid chamber 64 and second fluid chamber 66. Displacement of the diaphragm 52 in response to a sensed pressure causes the plate spring 82 of the motion detection device 80 to bend or flex thereby displacing the drive magnet 106 along the axis 112 to a position that corresponds to the pressure sensed by the diaphragm 52. The generally linear displacement and resulting position of the drive magnet 106 along the axis 112 corresponds to the differential pressure applied to the diaphragm 52 by the first and second fluids in the first and second fluid chambers 64 and 66.

The helical flanges 176 of the director members 166 and 168 compress and direct the magnetic North and South axially directed flux lines from the power magnet 150 to form a helical directed magnetic field. The helical directed magnetic field of the power magnet 150 aligns with the axially directed North and South flux lines emitted from the drive magnet 106. The drive magnet 106 is spaced apart from the power magnet 150 by the air gap. A magnetic circuit is formed between the drive magnet 106 and power magnet 150 that spans the air gap. Any generally linear movement of the drive magnet 106 along the axis 112 causes an angular or rotational displacement or movement of the pointer rotation device 120 about the axis 136 because the helical magnetic field emitted by the power magnet 150 continuously aligns itself with the magnetic field emitted by the drive magnet 106. As the drive magnet 106 moves along the axis 112 to a position that corresponds to the position of the diaphragm 52 and the pressure sensed by the diaphragm 52, the pointer rotation device 120 rotates the pointer 190 about the axis 136 in response to the position and movement of the drive magnet 106. Movement of the drive magnet 106 drives the rotation of the pointer rotation device 120 and pointer 190 about the axis 136 through the magnetic circuit that magnetically couples the pointer rotation device to the drive magnet 106. The rotational displacement of the pointer rotation device 120 about the axis 136 conjointly rotates the pointer 190 about the axis 136, such that the position of the pointer 190 with respect to the scale 74 provides an indication and reading of the pressure sensed by the diaphragm 52.

The motion detection device 80 and pointer rotation device 120 provide precise pointer rotational movement and indication of a pressure sensed by the diaphragm 52 in response to a generally linear displacement of the diaphragm 52. The pointer rotation device 120 translates generally linear displacements of the drive magnet 106 into a corresponding rotational displacement of the pointer rotation device 120 and pointer 190. The magnetic circuit formed between the drive magnet 106 and power magnet 150 enables the use of a large air gap between the pointer rotation device 120 and the drive magnet 106. As an example, with an air gap of approximately 0.80 inch, the rotational sensitivity of the pointer rotation device 120 provides approximately eight degrees of pointer rotation per 0.010 inch of diaphragm displacement. In addition, the accuracy of the pointer indication is typically plus or minus 0.0005 inch of the drive magnet position. The pointer rotation device thereby provides very precise pointer positioning to precisely indicate the pressure sensed by the diaphragm 52.

The ability to have a large air gap between the drive magnet 106 and pointer rotation device 120 enables the use of a plastic barrier wall 44 between the pointer rotation device 120 and the drive magnet 106, such that the fluids in the fluid chambers 64 and 66 are isolated from the pointer rotation device 120 and its bearings. Contamination of the bearings and of any portion of the pointer rotation device 120 is thereby prevented. The barrier wall 44 also prevents pressure loading of the viewing cover 46 by the first or second fluids thereby preventing cover failure due to accidental over-pressurization. A wide variety of fluids may be used in connection with the gauge 30 as the fluids are isolated from the pointer rotation device 120, and are prevented from contaminating the bearings 202, 204 and the pointer rotation device 120.

While the pointer rotation device 120 has been described herein for use in a gauge for measuring and indicating pressure, the pointer rotation device may be used in gauges for measuring and indicating flow rate, temperature, velocity and other variables.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A gauge for indicating a measured variable, said gauge including:
   a motion detection device including a drive magnet, said drive magnet adapted to be movable in response to changes in the variable;
   a pointer rotation device adapted to rotate about a first axis, said pointer rotation device including a pivot member, a power magnet coupled to said pivot member, a first director member located adjacent said power magnet, said first director member including a generally helical flange, and a second director member, said second director member including a generally helical flange, said power magnet being located between said first director member and said second director member, said flanges of said first director member and said second director member being generally equally spaced from one another; said power magnet forming a magnetic field adapted to magnetically couple said pointer rotation device to said drive magnet; and
   a pointer coupled to said pointer rotation device;
   whereby movement of said drive magnet of said motion detection device pivots said pointer rotation device and said pointer about said first axis.

2. The gauge of claim 1 wherein said helical flange of said first director member extends about and along said first axis.

3. The gauge of claim 2 wherein said helical flange extends approximately one-hundred eighty degrees about said first axis.

4. The gauge of claim 1 wherein said power magnet and said first director member form a helical directed magnetic field.

5. The gauge of claim 1 wherein said pivot member includes a post, said post extending through said first and second director members and through said power magnet, said first axis extending longitudinally through said post.

6. The gauge of claim 1 wherein said first director member and said second director member each include a respective gauge notch, and said pivot member includes a gauge member adapted to be received in said notches of said first and second director members, said gauging member adapted to align said first and second director members with respect to one another about said first axis.

7. The gauge of claim 1 wherein said drive magnet of said motion detection device is adapted to move along a second axis, said second axis being spaced apart from and generally parallel to said first axis, whereby generally linear movement of said drive magnet along said second axis is adapted to rotate said pointer rotation device about said first axis.

8. The gauge of claim 1 wherein said motion detection device is located in a first chamber and said pointer rotation device is located in a second chamber, said first chamber and said second chamber being separated by a fluid-tight barrier wall, said barrier wall being located between said drive magnet and said pointer rotation device.

9. The gauge of claim 1 wherein said first director member includes a mounting portion coupled to said pivot member, said mounting portion located at an inclined angle with respect to said first axis, said power magnet including a top surface adapted to engage said mounting member of said first director member, said top surface of said power magnet being located at an inclined angle with respect to said first axis.

10. The gauge of claim 1 wherein said first director member is formed from a magnetically permeable material.

11. The gauge of claim 1 wherein said helical flange of said first director member extends radially outwardly from said first axis beyond said power magnet.

12. The gauge of claim 1 wherein said motion detection device includes a resiliently flexible biasing member having a first end and a second end, said power magnet being coupled to said first end of said biasing member.

13. The gauge of claim 12 wherein said motion detection device includes an adjustment member coupled to said biasing member, said adjustment member being selectively positionable between said first and second ends of said biasing member to thereby selectively adjust the biasing force provided by said biasing member.

14. The gauge of claim 1 including a diaphragm adapted to sense changes in the variable, said drive magnet being conjointly moveable with said diaphragm in response to changes in the variable.

15. A pointer rotation device for rotating a pointer about a rotational axis in response to movement of a spaced apart drive magnet, said pointer rotation device comprising:
   a pivot member adapted to be coupled to the pointer for conjoint rotation about the rotational axis;
   a power magnet coupled to said pivot member for conjoint rotation with said pivot member about the rotational axis;
   a first director member located adjacent said power magnet and coupled to said pivot member for conjoint rotation about the rotational axis, said first director member including a generally helical flange, and a second director member coupled to said pivot member for conjoint rotation about the rotational axis, said second director member including a generally helical flange extending about the rotational axis, said power magnet being located between said first and second director members;
   whereby said power magnet forms a magnetic field adapted to couple said pivot member to the drive magnet such that movement of the drive magnet causes said pivot member and the pointer to rotate about the rotational axis.

16. The pointer rotation device of claim 15 wherein said first director member and said power magnet form a helical directed magnetic field.

17. The pointer rotation device of claim 15 wherein said helical flange of said first director member extends about and along the rotational axis.

18. The pointer rotation device of claim 15 wherein said first director member includes a mounting portion coupled to said pivot member, said mounting portion located at an inclined angle with respect to the rotational axis, said power magnet including a top surface adapted to engage said mounting member of said first director member, said top surface of said power magnet being located at an inclined angle with respect to the rotational axis.

* * * * *